(12) United States Patent
Spitzer et al.

(10) Patent No.: US 7,489,814 B2
(45) Date of Patent: Feb. 10, 2009

(54) METHOD OF AND DEVICE FOR MODULATING A DYNAMIC RANGE OF STILL AND VIDEO IMAGES

(75) Inventors: Hedva Spitzer, Tel Aviv (IL); Yan Karasik, Rishon LeZion (IL)

(73) Assignee: Ramot At Tel Aviv University Ltd., Tel-Aviv (IL)

( * ) Notice: Subject to any disclaimer, the term of this patent is extended or adjusted under 35 U.S.C. 154(b) by 1499 days.

(21) Appl. No.: 10/369,671

(22) Filed: Feb. 21, 2003

(65) Prior Publication Data

US 2004/0165086 A1 Aug. 26, 2004

(51) Int. Cl.
*G06K 9/00* (2006.01)
*G03F 3/08* (2006.01)

(52) U.S. Cl. .................. 382/167; 358/518; 358/523

(58) Field of Classification Search ......... 382/166–167, 382/162; 358/518–523
See application file for complete search history.

(56) References Cited

U.S. PATENT DOCUMENTS

| | | | |
|---|---|---|---|
| 5,343,254 A * | 8/1994 | Wada et al. ............. | 348/627 |
| 5,991,456 A | 11/1999 | Rahman et al. | |
| 6,212,304 B1 | 3/2001 | Durg et al. | |
| 6,674,544 B2 * | 1/2004 | Shiota et al. ............ | 358/1.9 |
| 2003/0026494 A1 | 2/2003 | Woodell et al. | |

FOREIGN PATENT DOCUMENTS

EP 0901671 3/2003
WO WO 95/33306 12/1995

OTHER PUBLICATIONS

R. Fattal et al., "Gradient Domain High Dynamic Range Compression", *Proc. ACM Siggraph,* Jul. 2002, pp. 249-256.
Pattanaik et al., "Adaptive Gain Control for High Dynamic Range Image Display", *Proc.* Proceedings of Spring Conference in Computer Graphics (SCCG2002), Apr. 24-27, 2002, Budmerice, Slovak Republic.
Creutzfeldt et al., "The Neurophysiological Correlates of Color and Brightness Contrast in Lateral Geniculate Neurons: I. Population Analysis, and II. Adaptation and Surround Effects", *Exp. Brain Res.,* 87:1-21, 22-45, 1991.
C. Mead, "Analog VLSI and Neural Systems", (Table of Contents), Addison-Wesley, Reading, Mass., 1989.

(Continued)

*Primary Examiner*—Matthew C Bella
*Assistant Examiner*—Randolph Chu

(57) ABSTRACT

A method of modulating a dynamic range of a plurality of picture elements each containing image information. The method comprises: (a) inputting the plurality of picture elements and extracting, from the image information of a picture element of the plurality of picture elements an intensity level being in a first dynamic range; and (b) for the picture element: (i) defining a surrounding region of picture elements and a remote region of picture elements; (ii) selecting at least one adaptation weight-function; and (iii) using the at least one adaptation weight-function and intensity levels of each picture element of the surrounding and the remote regions, for assigning a new intensity level to the picture element, the new intensity level being in a second dynamic range, thereby modulating the dynamic range of the plurality of picture elements.

38 Claims, 10 Drawing Sheets

OTHER PUBLICATIONS

Jobson et al., "A Multiscale Retinex for Bridging the Gap Between Color Images and the Human Observation of Scenes", published in *IEEE Trans. Image Processing* 6:965-976, 1997.

Rahman, Z et al., "A Multi Retinex for Color Rendition and Dynamic Range Compression", SPIE International Symposium on Optical Science, Engineering, and Instrumentation, *Applications of Digital Image Processing XIX,* Andrew G. Tescher, ed., Proc. SPIE 2825, (1996).

K. I. Naka and W. A. H. Rushton, "S-Potentials From Color Units in the Retina of Fish", *J. Physiol..* 185:536-555, 1966.

R. A. Normann et al., "Cone Photoreceptor Physiology and Cone Contribution to Color Vision", Gouras P., Ed., The Perception of Color, pp. 146-162, MacMillen Press, London, 1991.

Spitzer et al. "Color Constancy: A Biological Model and Its Application for Still and Video Images", Pattern Recognition, 35(8): 1645-1659, 2002. Abstract, Sec.2: Model From p. 1646-1649, Sec.4.4: Video Sequences, p. 1656-1658, Fig.1.

Spitzer et al. "Biological Gain Control for High Dynamic Range Compression", Final Program and Proceedings of the IS & T & SID—11th Color Imaging Conference: Color Science and Engineering: Systems, Technologies, Applications, p. 42-50, 2003.

Wyszecki et al. "Color Science Concepts and Methods, Quantitative Data and Formulae", Wiley & Sons, 2000. Short Description. p. 156-166.

* cited by examiner

METHOD OF AND DEVICE FOR MODULATING A DYNAMIC RANGE OF STILL AND VIDEO IMAGES

FIELD AND BACKGROUND OF THE INVENTION

The present invention relates to image processing and, more particularly, to a device for and a method of modulation of a dynamic range of an image.

Digital images may contain a huge amount of data, especially for high quality display and printing. Colored images are commonly displayed by three or more channels, such as Red-Green-Blue (RGB) channels (for display) or Cyan-Magenta-Yellow-Black (CMYK) images (for print). The source of most images is an imaging device, such as a digital camera, a scanner and the like, in which signal is first captured by a light-sensitive device, and digitized thereafter.

In video capture, digital photography and digital scanning, the image is acquired by means of an electronic sensor such as a charge-coupled device (CCD) or a complimentary metal-oxide semiconductor (CMOS) device with cells sensitive to electromagnetic radiation such as visible light, infrared or ultra-violet waves. In medical or astronomical imaging, images may also be acquired by X-ray, sound-wave, magnetic-field, microwave or radiowave sensitive detectors.

Commercially available digital imaging devices based upon CCD detector arrays are known to acquire image information across a wide dynamic range of the order of 2 to 3 orders of magnitude. It is expected that with the rapid technologically development in the field of digital imaging, this range will most likely be broadened in the near future. Typically however, although at the time of image capture the acquired dynamic range is rather large, a substantial portion of it is lost once the image is digitized, printed or displayed. For example, most images are digitized to 8-bits (256 levels) per color-band, i.e., a dynamic range of about two orders of magnitude. The problem is aggravated once the image is transferred to a display or a print medium which is often limited to about 50 levels per color-band.

A novel imaging technology, recently developed, employs CMOS with active pixel sensors [O. Yadid-Pecht and E. Fossum, "Image Sensor With Ultra-High-Linear-Dynamic Range Utilizing Dual Output CMOS Active Pixel Sensors", *IEEE Trans. Elec. Dev.*, Special issue on solid state image sensors, Vol. 44, No. 10, 1721-1724], which are capable of locally adjusting the dynamical range, hence to provide a high quality image with high dynamic range.

In addition, over the past years software solutions were developed for fuse multiple exposures of the same scene at low dynamic range (e.g., 256 levels per color-band) into one high dynamic range image (of about 4 orders of magnitudes). Yet, it is recognized that these solutions are only partially exploited due to the bottle neck of low dynamic range during display.

The motivation for developing imaging devices capable of capturing high dynamic range images is explained by the enormous gap between the performances of the presently available devices and the ability of the human visual system to acquire detailed information from an ultra-high dynamic range scene. Specifically, the human visual system, which is capable of acquiring a dynamic range of 14 orders of magnitude, can easily recognize objects in natural light having a dynamic range of 12 orders of magnitude.

Still, there is a growing gap between the state-of-the-art imaging devices and display devices. High quality images, obtained either with photographical film or by digital cameras, suffer, once displayed on a screen or printed as a hard copy from loss in clarity of details and colors at extreme light intensities, within shadows, dark regions, extremely bright regions and/or surfaces close to a lightening source. For example, as a single sharp edge in natural scene (e.g., a shaded object in illuminated scene) can reach a dynamic range of 2 orders of magnitudes, presently available display devices may not be able to recognize such an edge. Another severe problem is that in a specific exposure a dark region of the image may be seen while a bright region is over exposed, or vise versa.

One method of dynamic range compression of images is found in R. Fattal et al., "Gradient Domain High Dynamic Range Compression", *Proc. ACM SIGGRAPH,* 2002, where large gradients are attenuated and a low gradient display is constructs by solving the Poisson equation on a modified gradient field.

In an additional method, primarily directed at correcting halo artifacts, high contrast edges are detected while the influence of extreme pixels whose intensity variations are above a factor of 5 are removed, to obtain a dynamic range without the halo artifacts [Pattanaik et al., *Proc. SCCG,* 24-27, 2002].

The above methods were applied solely on static images (still photography) and shown only limited results, both in terms of the dynamic range being compressed and in terms of the quality of the produced images.

The rational behind the above methods was primarily of mathematical or physical nature. In addition, there are also several methods for compression of a dynamic range of an image, which are based on psychophysiological findings. However, there is no presently known method which is based on physiological mechanisms, such as adaptation.

It is commonly believed that the ability of the human visual system to acquire wide range of illuminations in the same scene is through physiological phenomena known as lightness constancy and lightness gain control. Physiological findings have shown [O. D. Creutzfeldt et al., "The Neurophysiological Correlates of Color and Brightness Contrast in Lateral Geniculate Neurons: I. Population Analysis, and II. Adaptation and Surround Effects", *Exp. Brain Res.,* 87:1-21, 22-45, 1991] that the induction phenomenon is originated in the retinal receptors and ganglion cells, where in addition to central receptors in the receptive field, surrounding and remote regions of receptors, are inputted to the ganglion cells. Additionally it is hypothesized that the peripheral area that extends far beyond the borders of the classical receptive field of the ganglion cells is also inputted to the ganglion cells, thereby affecting the perceived image.

Application of human vision theories to image processing, which is based on the physiological concept of a center/surround retinal cells, has been attempted in the prior art. For example, to mimic the dynamic range compression of human vision, a detector array with integrated processing in analog silicon chips used a logarithm transformation prior to the surround formation [C. Mead, "Analog VLSI and Neural Systems", Addison-Wesley, Reading, Mass., 1989].

Another model, commonly known as the Retinex model, is disclosed in U.S. Pat. No. 5,991,456. This method is directed at improving a digital image on an RGB scale both in terms of a dynamic range compression and in terms of color independence from the spectral distribution of the scene illuminant, by subtracting logarithms of intensity values, so as to adjust the intensity of a specific pixel using the surrounding pixels (see also, Jobson et al., "A Multiscale Retinex for Bridging the Gap Between Color Images and the Human Observation of Scenes", published in *IEEE Trans. Image Processing* 6:965-976, 1997; and Rahman, Z et al., "A Multi Retinex for Color Rendition and Dynamic Range Compression", *SPIE International Symposium on Optical Science, Engineering, and Instrumentation, conference on Signal and Image Processing*).

These attempts, however, fail to address the effect of remote regions of the receptive fields cells (in addition to the color coded retinal cells and physiological adaptation mechanism), hence had only partial success in providing a compression of the huge dynamic range (larger than two order of magnitude) of the scene into the low dynamic range of the display, while maintaining the contrast of the image. It is appreciated that the so-called color constancy mechanism of the visual system, which is related to color coded retinal cells (the cones of the retina) is different than the huge dynamic range compression mechanism, which is related to intensity levels of the rods and cones of the retina. Hence, algorithms attempting to combine color constancy with huge dynamic range (e.g., the Retinex algorithm) unavoidably impose some level of compromising on the physiological assumptions and fail to provide high quality results both for color constancy and for huge dynamic range.

Also of prior art of relevance is International Application No. WO 95/33306, which discloses a signal processor that performs a real time approximation of the non-causal feedback Automatic Gain Control model, for natural process occurring in biological sensors.

In all the prior art image processing techniques, the dynamic range compression is still limited, and images processed using the above methods suffer from non-negligible information loses, once displayed on a conventional display device. In addition, prior art methods fail to provide a physiologically inspired high dynamic range compression in moving images (video).

There is thus a widely recognized need for, and it would be highly advantageous to have, a dynamic range modulation device and a method of modulating an image having a high dynamic range devoid of the above limitations.

SUMMARY OF THE INVENTION

According to one aspect of the present invention there is provided a method of modulating a dynamic range of a plurality of picture elements each containing image information, the method comprising: (a) inputting the plurality of picture elements and extracting, from the image information of a picture element of the plurality of picture elements an intensity level being in a first dynamic range; and (b) for the picture element: (i) defining a surrounding region of picture elements and a remote region of picture elements; (ii) selecting at least one adaptation weight-function; and (iii) using the at least one adaptation weight-function and intensity levels of each picture element of the surrounding and the remote regions, for assigning a new intensity level to the picture element, the new intensity level being in a second dynamic range, thereby modulating the dynamic range of the plurality of picture elements.

According further features in the preferred embodiments described below, the step of extracting the intensity level comprises transforming the image information to a color coordinate-system having an intensity component and setting the intensity component to be the intensity component.

According to still further features in the described preferred embodiments the method further comprising combining the image information and the new intensity level, and performing a backward color coordinate-system transformation so as to provide a new image, represented by the plurality of picture elements and characterized by the second dynamic range.

According to still further features in the described preferred embodiments the method further comprising redefining the intensity level using a saturation function.

According to still further features in the described preferred embodiments the method further comprising defining a center region for the picture element.

According to still further features in the described preferred embodiments the method further comprising calculating an overall center intensity using a center spatial profile, calculating an overall surround intensity using a surround spatial profile, and calculating an overall remote intensity using a remote spatial profile.

According to still further features in the described preferred embodiments at least one of the overall center intensity, the overall surround intensity and the overall remote intensity is calculated so as to substantially reduce halo artifacts.

According to still further features in the described preferred embodiments the assigning the new intensity level comprises adapting the overall center intensity by calculating an adaptation function having a center adaptation term and a surround adaptation term.

According to still further features in the described preferred embodiments the center and the surround adaptation terms each independently characterizes a dynamical intensity curve.

According to still further features in the described preferred embodiments the method further comprising determining a local-contrast by calculating a difference between the intensity level of the picture element and intensity level of picture elements of the surrounding region.

According to still further features in the described preferred embodiments the method further comprising redefining the overall center intensity, by performing a time-convolution of a first adaptive low-pass temporal filter with the overall center intensity.

According to still further features in the described preferred embodiments the method further comprising redefining the overall surround intensity, by performing a time-convolution of a second adaptive low-pass temporal filter with the overall surround intensity.

According to still further features in the described preferred embodiments the method further comprising redefining the overall remote intensity, by performing a time-convolution of a third adaptive low-pass temporal filter with the overall remote intensity.

According to another aspect of the present invention there is provided a dynamic range modulation device for modulating a dynamic range of a plurality of picture elements each containing image information, the dynamic range modulation device comprising: (a) an input unit for inputting the plurality of picture elements; (b) an intensity extractor, for extracting from the image information of a picture element of the plurality of picture elements an intensity level being in a first dynamic range; (c) a region definer, operable to define, for the picture element, a surrounding region of picture elements and a remote region of picture elements; (d) an adaptation weight-function selector, for selecting at least one adaptation weight-function; and (e) an intensity calculator, for calculating and assigning a new intensity level being in a second dynamic range to the picture element, thereby modulating the dynamic range of the plurality of picture elements.

According to further features in preferred embodiments of the invention described below, the intensity extractor comprises a first transformation unit for transforming the image information to a color coordinate-system having an intensity component.

According to still further features in the described preferred embodiments the dynamic range modulation device further comprising an image provider being associated with a second transformation unit, the image provider and the second transformation unit are designed and configured for combining the image information and the new intensity level, and for performing a backward color coordinate-system transformation so as to provide a new image, represented by the plurality of picture elements and characterized by the second dynamic range.

According to still further features in the described preferred embodiments the dynamic range modulation device further comprising electronic-calculating functionality for redefining the intensity level using a saturation function.

According to still further features in the described preferred embodiments the dynamic range modulation device further comprising electronic-calculation functionality for calculating an overall center intensity using a center spatial profile, calculating an overall surround intensity using a surround spatial profile, and calculating an overall remote intensity using a remote spatial profile.

According to still further features in the described preferred embodiments the electronic-calculation functionality for calculating the overall center intensity, the overall surround intensity and the overall remote intensity is operable to substantially reduce halo artifacts.

According to still further features in the described preferred embodiments the reducing of halo-artifacts is by replacing the intensity level of picture element having an intensity level which is above a predetermined threshold, prior to the calculation of the overall center, surround and/or remote intensities and restoring the original intensity level of the picture element thereafter.

According to still further features in the described preferred embodiments sizes of the center, surround and/or remote regions is selected so as to substantially reduce halo artifacts.

According to still further features in the described preferred embodiments widths of the center, surround and/or remote spatial profiles are selected so as to substantially reduce halo-artifacts.

According to still further features in the described preferred embodiments the dynamic range modulation device further comprising electronic-calculation functionality for redefining the overall center intensity, by performing a time-convolution of a first adaptive low-pass temporal filter with the overall center intensity.

According to yet another aspect of the present invention there is provided an imaging device having an image capturing device and a dynamic range modulation device, the dynamic range modulation device comprising: (a) an input unit, for inputting a plurality of picture elements as captured by the image capturing device, wherein each picture element of the plurality of picture elements contains image information; (b) an intensity extractor, for extracting from the image information of a picture element of the plurality of picture elements an intensity level being in a first dynamic range; (c) a region definer, operable to define, for the picture element, a surrounding region of picture elements and a remote region of picture elements; (d) an adaptation weight-function selector, for selecting at least one adaptation weight-function; and (e) an intensity calculator, for calculating and assigning a new intensity level being in a second dynamic range to the picture element, thereby modulating the dynamic range of the plurality of picture elements.

According to further features in the preferred embodiments described below, the second dynamic range is smaller than the first dynamic range.

According to still further features in the described preferred embodiments the plurality of picture elements are plurality of pixels.

According to still further features in the described preferred embodiments the image capturing device is selected from the group consisting of a camera, a digital camera, a video camera, a CMOS digital camera, a scanner, a computerized tomography scanner, a magnetic resonance imaging scanner, an ultrasonic scanner, an endoscopic imaging device, a radio telescope, a digital telescope and a digital microscope.

According to still further features in the described preferred embodiments the color coordinate-system is a CIE XYZ color coordinate-system.

According to still further features in the described preferred embodiments the dynamic range modulation device further comprises an image provider being associated with a second transformation unit, the image provider and the second transformation unit are designed and configured for combining the image information and the new intensity level, and for performing a backward color coordinate-system transformation so as to provide a new image, represented by the plurality of picture elements and characterized by the second dynamic range.

According to still further features in the described preferred embodiments the dynamic range modulation device further comprises electronic-calculating functionality for redefining the intensity level using a saturation function.

According to still further features in the described preferred embodiments the saturation function is a modified Naka-Rushton function.

According to still further features in the described preferred embodiments the region definer is further operable to define a center region for the picture element.

According to still further features in the described preferred embodiments the at least one adaptation weight function comprises a center-remote adaptation weight-function.

According to still further features in the described preferred embodiments the difference is calculated by a procedure selected from the group consisting of subtraction, division, subtraction of logarithms, discrete differentiation and discrete logarithmic differentiation.

According to still further features in the described preferred embodiments the center-remote adaptation weight function is selected to have small numerical values if the local-contrast is high and higher numerical values for if the local-contrast is low.

According to still further features in the described preferred embodiments the dynamic range modulation device further comprises electronic-calculation functionality for calculating an overall center intensity using a center spatial profile, calculating an overall surround intensity using a surround spatial profile, and calculating an overall remote intensity using a remote spatial profile.

According to still further features in the described preferred embodiments the overall center intensity is an inner product of intensity levels and the center spatial profile over the center region.

According to still further features in the described preferred embodiments the overall surround intensity is an inner product of intensity levels and the center spatial profile over the surrounding region.

According to still further features in the described preferred embodiments the overall remote intensity is an inner product of intensity levels and the center spatial profile over the remote region.

According to still further features in the described preferred embodiments the center spatial profile, the surround spatial profile and the remote spatial profile are each independently spatial decaying function.

According to still further features in the described preferred embodiments the center spatial profile, the surround spatial profile and the remote spatial profile are each independently selected from the group consisting of a Gaussian, an exponent, a Lorenzian, a modified Bessel function and a power-decaying function.

According to still further features in the described preferred embodiments the surround spatial profile is normalized to a surround-center ratio parameter.

According to still further features in the described preferred embodiments the center spatial profile and the center spatial profile are normalized to a unity.

According to still further features in the described preferred embodiments the intensity calculator comprises an adaptor, for adapting the overall center intensity, using an adaptation function having a center adaptation term and a surround adaptation term.

According to still further features in the described preferred embodiments the center and the surround adaptation terms are selected so as to maintain an inequality direction with respect to the intensity level of the picture element and intensity levels of other picture elements of the plurality of picture elements.

According to still further features in the described preferred embodiments the center adaptation term comprises a center-local part and a center-remote part, the center-local part being a function of the overall center intensity, and the center-remote part being a function of the overall remote intensity.

According to still further features in the described preferred embodiments the center-local part is a linear function of the overall center intensity, the linear function being characterized by constant coefficients.

According to still further features in the described preferred embodiments the center-local part is a linear function of the overall center intensity, the linear function being characterized by variables coefficients.

According to still further features in the described preferred embodiments the center-remote part is defined as a multiplication between the center-remote adaptation weight-function and the overall remote intensity.

According to still further features in the described preferred embodiments the surround adaptation term comprises a surround-local part and a surround-remote part, the surround-local part being a function of the overall surround intensity, and the surround-remote part being a function of the overall remote intensity.

According to still further features in the described preferred embodiments the surround-local part is a linear function of the overall surround intensity, the linear function being characterized by constant coefficients.

According to still further features in the described preferred embodiments the surround-local part is a linear function of the overall surround intensity, the linear function being characterized by variables coefficients.

According to still further features in the described preferred embodiments the at least one adaptation weight function further comprises a surround-remote adaptation weight-function.

According to still further features in the described preferred embodiments the imaging device further comprising a local-contrast determinator operable to calculate a difference between the intensity level of the picture element and intensity level of picture elements of the remote region.

According to still further features in the described preferred embodiments the surround-remote adaptation weight function is selected to have small numerical values if the local-contrast is high and higher numerical values for if the local-contrast is low.

According to still further features in the described preferred embodiments the surround-remote part is defined as a multiplication between the surround-remote adaptation weight-function and the overall remote intensity.

According to still further features in the described preferred embodiments the coefficients of the center-local and the surround-local parts are each independently selected so as to substantially reduce halo-artifacts.

According to still further features in the described preferred embodiments the intensity level is static, hence the plurality of picture elements constitutes a still image being characterized by the first dynamic range.

According to still further features in the described preferred embodiments the intensity level varies with time hence the plurality of picture elements constitutes a sequence of images, characterized by the first dynamic range.

According to still further features in the described preferred embodiments sequence of images is a video sequence of images.

According to still further features in the described preferred embodiments the overall center intensity, the overall surround intensity and the overall remote intensity are static.

According to still further features in the described preferred embodiments the overall center intensity, the overall surround intensity and the overall remote intensity vary with time.

According to still further features in the described preferred embodiments the dynamic range modulation device further comprises electronic-calculation functionality for redefining the overall center intensity, by performing a time-convolution of a first adaptive low-pass temporal filter with the overall center intensity.

According to still further features in the described preferred embodiments the first adaptive low-pass temporal filter is characterized by a first time-dependent decay duration.

According to still further features in the described preferred embodiments a value of the first time-dependent decay duration at time, t, is determined by a value of the overall center intensity at a preceding time, t'.

According to still further features in the described preferred embodiments the dynamic range modulation device further comprises electronic-calculation functionality for redefining the overall surround intensity, by performing a time-convolution of a second adaptive low-pass temporal filter with the overall surround intensity.

According to still further features in the described preferred embodiments the second adaptive low-pass temporal filter is characterized by a second time-dependent decay duration.

According to still further features in the described preferred embodiments a value of the second time-dependent decay duration at time, t, is determined by a value of the overall surround intensity at a preceding time, t'.

According to still further features in the described preferred embodiments the dynamic range modulation device further comprises electronic-calculation functionality for redefining the overall remote intensity, by performing a time-convolution of a third adaptive low-pass temporal filter with the overall remote intensity.

According to still further features in the described preferred embodiments the third adaptive low-pass temporal filter is characterized by a third time-dependent decay duration.

According to still further features in the described preferred embodiments a value of the third time-dependent decay duration at time, t, is determined by a value of the overall remote intensity at a preceding time, t'.

According to still further features in the described preferred embodiments the center, the surrounding and the remote regions are characterized by periodic boundary conditions.

The present invention successfully addresses the shortcomings of the presently known configurations by providing a dynamic range modulation device and a method of modulating an image having a high dynamic range.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. In case of conflict, the patent specification, including definitions, will control. In addition, the materials, methods, and examples are illustrative only and not intended to be limiting.

Implementation of the method and system of the present invention involves performing or completing selected tasks or steps manually, automatically, or a combination thereof. Moreover, according to actual instrumentation and equipment of preferred embodiments of the method and system of the present invention, several selected steps could be implemented by hardware or by software on any operating system of any firmware or a combination thereof. For example, as hardware, selected steps of the invention could be implemented as a chip or a circuit. As software, selected steps of the invention could be implemented as a plurality of software instructions being executed by a computer using any suitable operating system. In any case, selected steps of the method and system of the invention could be described as being performed by a data processor, such as a computing platform for executing a plurality of instructions.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings.

DESCRIPTION OF THE PREFERRED EMBODIMENTS

The present invention is of a device for and a method of modulation of a dynamic range of an image, such as a still image or a video image. Specifically, the present invention can be used for providing an automatic dynamic range modulation of a high dynamic range image while maintaining or even improving the contrast thereof. The present invention is further of an imaging device incorporating therewith the dynamic range modulation device.

Figure 1:
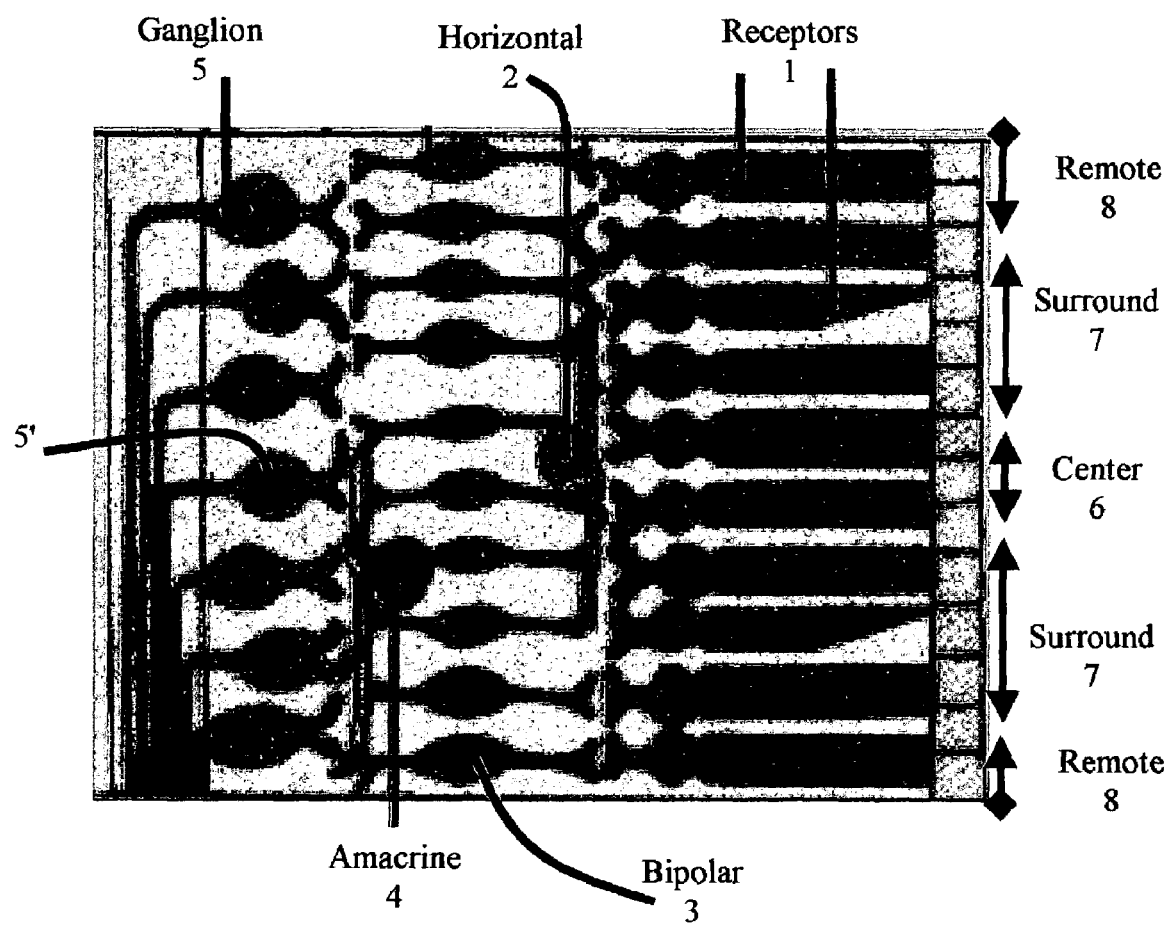
FIG. 1 is a schematic illustration of the human retina cross section.

For purposes of better understanding the present invention, as illustrated in FIGS. 2-10 of the drawings, reference is first made to the human vision system as illustrated in FIG. 1.

Referring now to the drawings, FIG. 1 illustrates a schematic cross section of the human retina, showing that the retina consists of five layers of cells, receptors 1, horizontal cells 2, bipolar cells 3, amacrine cells 4, and retinal ganglion cells 5. Receptors 1 are stimulated by light and pass information to retinal ganglion cells 5, by a sequential series of biochemical and then electrical messages, through the intermediate layers of the retina.

Ganglion cells 5 are known to perform "gain control" operation, in which the response curve, rather than being a constant saturation curve, it is dynamically shifted from one saturation curve to another, after a certain amount of illumination has been viewed, thus leading to a new adaptation state of ganglion cells 5 [R. Dahari and H. Spitzer, "Spatio-Temporal Adaptation Model for Retinal Ganglion Cells", *J. Opt. Soc. Am.*, A:13, 419-439, 1996].

A known physiological phenomenon in the human vision system is the so called "induction phenomenon", according to which the perceived image, is not just a simple function of the stimulus from specific receptor cell, but rather a more complicated combination of other stimuli, originating from other receptors in the field of view.

Hence, considering a specific ganglion cell 5', the indirect input of ganglion cell 5' includes both receptors 6 of the center receptive field area and receptors 7 of the nearby, referred to below as surrounding, receptive field area. The human vision mechanism operates in retinal ganglion cell 5', by subtracting surround responses from center color. In addition, it is believed that the processing at the retinal ganglion cell level further includes influences of responses from receptors 8 being in a "remote" area of the receptive field that is even farther than the "surround" area from the "center" area.

U.S. Pat. No. 5,771,312, the contents of which are hereby incorporated by reference, discloses an advanced algorithm for partially correcting color images for colored illumination without knowledge of either the color or the intensity of the illumination. This algorithm exploits the above physiological mechanisms and phenomena of the visual system, to process the color channels of an image, thereby to achieve a "color constancy", in which the perceived color remains more constant and decouples from the spectral composition of the light reflected from it under varying colored illumination.

While conceiving the present invention it has been hypothesized and while reducing the present invention to practice it has been realized that the human vision principles of the achromatic retinal cells may be exploited to process the intensity channel of an image, rather than the color channels, for the purpose of promoting the lightness constancy hence modulating the dynamic range of an image.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

According to one aspect of the present invention there is provided a method of modulating a dynamic range of a plurality of picture elements, where each picture element contains image information.

Figure 2:
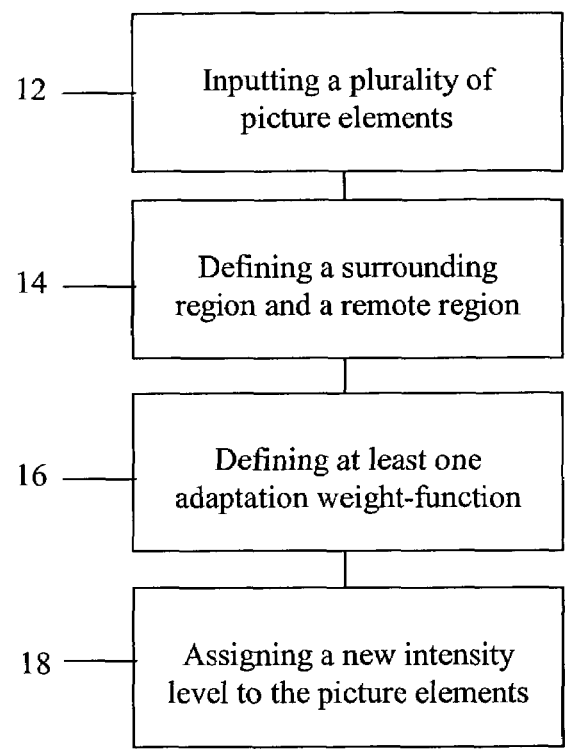
FIG. 2 is a flowchart of a method of modulating a dynamic range of a plurality of picture elements, according to the present invention.

Referring now again to the drawings, the method comprises the following method steps which are illustrated in the flowchart of FIG. 2. Hence, in a first step, designated by Block 12, a plurality of picture elements (e.g, a plurality of pixels) is inputted, and an intensity level is extracted from the image information of the picture elements. The method is primarily directed at providing a dynamic range modulation of images having a substantially high dynamic range, therefore the extracted intensity levels are characterized by a first dynamic range. Preferably, the first dynamic range is of two or more orders of magnitude, more preferably the first dynamic range is of more than two orders of magnitude.

Ideally, the input to the method is the spectrum of a scene as a function of wavelength, measured at the plurality of picture elements. This ideal input rarely is attainable in practical systems. Therefore, the scope of the present invention includes the processing of images obtained by other means. For example, the image information may be in the form of analog signals from transducers whose spectral responses are similar to the spectral responses of cone cells in the retina, in which case the image information is in the form of electrical signals, typically voltage levels, which may be processed directly, using analog hardware. Alternatively, the analog signals may be digitized, and processed digitally according to the present invention.

Still alternatively, the input to the method may be a plurality of digital signals, such as those acquired by, for example, still or video cameras. In this case, the image information may be realized in any known format, provided that the intensity levels of the picture elements are extractable. Preferably, the intensity level is extracted by transforming the image information format to a coordinate-system having an intensity component and setting the intensity level to be the intensity component. For example, if the image information is in the RGB format, then, one way to extract the image information is first to transform the RGB format to an CIE XYZ coordinate-system and then to set the intensity level to be the Y component of the CIE XYZ coordinate-system. Additionally, the CIE XYZ coordinate-system may be transformed to a CIE xyz coordinate-system. The transformation from RGB coordinate-system, to CIE XYZ coordinate-system may be found, for example, in G. Wyszecki and W. S. Styles, "Color Science" (Wiley, 1982), pages 139 and 615, the contents of which are hereby incorporated by reference.

According to a preferred embodiment of the present invention a copy of the image information is stored in a memory for the purpose of reconstructing the original format, once the processing of the image, as further detailed hereinunder, is completed.

It is to be understood that references to an "image" herein are references to values at picture elements, treated collectively, as an array. Thus, the term "image" as used herein includes purely mathematical objects, and does not necessarily correspond to a physical image, although the original input images certainly do correspond to physical images.

In what follows, the description is directed at the data processing of an arbitrarily chosen picture element, generally referred to herein as element 20. It is to be understood that the method steps are preferably repeated independently for most or all the picture elements.

Also, as used herein, the term about refers to ±10%.

Hence, according to a preferred embodiment of the present invention, the method further comprises an optional step of redefining the intensity level of element 20 using a saturation function, thereby modeling the response of the retinal receptive fields to the input stimuli. Any saturation function may be used for this purpose, such as, but not limited to, the Naka-Rushton saturation function or a modification thereof [K. I. Naka and W. A. H. Rushton, "S-Potentials From Color Units in the Retina of Fish", *J. Physiol.* 185:536-555, 1966; R. A. Normann et al., "Cone Photoreceptor Physiology and Cone Contribution to Color Vision", Gouras P., Ed., The Perception of Color, 146-162, MacMillen Press, London, 1991, R. Dahari and H. Spitzer, ibid]. The mathematical realization of this step is further detailed hereinafter.

In a second step of the method, designated by Block 14 in FIG. 2, a surrounding region and a remote region are defined for element 20. As further detailed hereinafter, these regions, preferably measured in units of picture elements, are used to simulate the above-described physiological adaptation mechanism of the human visual system. According to a preferred embodiment of the present invention an additional region, a center region of picture elements, may also be defined, which center region may comprise element 20 and picture elements immediately adjacent to element 20. Alternatively, the center region may be a single element region, hence comprising only element 20. This alternative, of course coincide with the embodiment in which no center region is selected.

Figure 3:
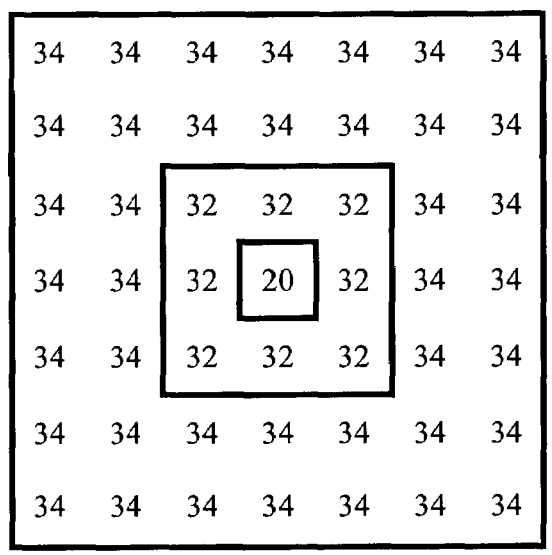
FIG. 3 shows center, surrounding and remote regions of picture elements, according to the present invention.

The concept of the center, surrounding and remote regions may be better understood from the following example, with reference to FIG. 3. Thus, if the plurality of picture elements is arranged in a rectangular grid 30, the center region may be a single picture element (element 20), the surround region may be picture elements 32 surrounding picture elements 20 and the remote region may be picture elements 34, surrounding picture elements 32. Other definitions for the center, surrounding and remote regions are not excluded from the present invention, both for a rectangular grid or for any other arrangement, according to which the plurality of picture elements are inputted.

In a third step of the method, designated by Block 16 of FIG. 2, at least one adaptation weight-function is defined, for the purpose of modulating the relative weight of the above regions on element 20. Several adaptation weight-functions may be defined. For example, in one embodiment, two adaptation weight-functions are defined for modulating the picture elements in the center and surrounding regions due to the intensity level of picture elements in the remote region. In this embodiment, the adaptation weight-functions are termed herein a "center-remote" adaptation weight-function and a "surround-remote" adaptation weight-function, respectively. Other adaptation weight-function functions for other combination of regions are also not excluded from the scope of the present invention.

In a fourth step of the method, designated by Block 18, the adaptation weight-functions and intensity levels of picture elements of the above predefined regions (surrounding, remote and optionally center) are used for assigning a new intensity level to element 20, where the new intensity level is in a second dynamic range.

Once the new intensity level is assigned, it is preferably combined with the image information of element 20, and transformed backwards to the original color coordinate-system.

As stated, the above method steps are preferably repeated for all the picture elements, hence modulating the dynamic range thereof and providing a new image, represented by the plurality of picture elements and characterized by a second dynamic range.

The second dynamic range is selected so as to optimize the resultant image and substantially reduce information loses therefrom while displayed on a display device, such as, but not limited to, a printer, a monitor and a projector. The second dynamic range depends, inter alia, on the type of the image, the first (the original) dynamic range, the existence or non existence of extreme light conditions and the like. For example, for an image which is characterized by a dynamic range of many orders of magnitude (e.g., four orders of magnitude) the second dynamic range may be smaller than the first dynamic range, so as to comply with the limitation of the display device being in use; for a standard RGB image, the second dynamic range of the entire image may be the same is the first dynamic range, however, for specific regions of the image, e.g., regions subjected to extreme light conditions, the second dynamic range may be larger, smaller, or shifted relative to the original dynamic range. In any case, as further detailed hereinbelow and demonstrated in the Examples section that follows, the embodiments of the present invention provide a well define prescription of selecting an appropriate value for the new intensity level which is assigned to element 20 so as to significantly improve the image.

The mathematical formulation of the method, as delineated hereinabove will now be provided.

Hence, as stated, the intensity level of element 20 is preferably redefined using a saturation function. Denoting the intensity level of element 20 by I, the redefinition of I may be in accordance with the following Naka-Rushton equation:

$$I := I^n(I^n + \sigma_{NR}^n) \quad \text{(EQ. 1)}$$

where, n and $\sigma_{NR}$ are Naka-Rushton exponent and saturation constant, respectively, and the ":=" symbol represents redefinition. A typical value for n is from 1 to 4 and a typical value for $\sigma_{NR}$ is about 250 cd/m².

Once the surround, the remote and optionally the center regions are defined, the intensities of the picture elements in each region are preferably used for calculating, for each region, an overall regional intensity, $G_r$, where the subscript "r" is to be understood as a regional subscript. Specifically, for the center region r should be replaced by the subscript "center", for the surrounding region r should be replaced by the subscript "surround" and for the remote region r should be replaced by the subscript "remote".

According to a preferred embodiment of the present invention the overall intensity may be calculated using a regional spatial profile, $f_r$. More preferably, the overall intensity is calculated as an inner product of the intensity of the picture elements in each region with the respective regional spatial profile. Mathematically this inner product is realized by the following equation:

$$G_r = \int I f_r ds \quad \text{(EQ. 2)}$$

where ds is an area integration measure, which is selected in accordance with the arrangement of the inputted picture elements, e.g., for a rectangular x-y grid-like arrangement ds equals dx dy. The area of integration of Equation 2 depends on the regional subscript, r. Specifically, for the overall center intensity, $G_{center}$, the integration area typically extends over one picture element (element 20), for the overall surround intensity $G_{surround}$, the integration area typically extends over eight picture elements immediately surrounding element 20 (see FIG. 3), but may include the 16 picture elements immediately surrounding those eight picture elements, thereby extending over a total of 24 picture elements. For the overall remote intensity, $G_{remote}$, the integration area typically extends over a 0.1-10% of the image, but may extend over as few as the 24 picture elements that are preferably the maximum for the surrounding region. For example, a typical remote integration area for a 400×400 image is about 300 picture elements surrounding element 20. At the boundaries of the images, all the integrations preferably facilitate periodic boundary conditions.

A known phenomenon in the field of image-processing is the appearance of halo artifacts, surrounding the imaged objects. The halo artifacts are typically formed near edges of large contrast, and can be explained mathematically as originated from large intensity derivatives at the respective picture elements. The present invention, in a preferred embodiment, successfully provides a procedure for substantially reducing or eliminating halo artifacts. The procedure of halo artifacts reduction/elimination preferably comprises a halo-test, performed so as to determine a possible contribution of the respective picture element to a formation of a halo artifact. According to a preferred embodiment of the present invention, a picture element in which the intensity level is substantially different than the intensity level of element 20 is defined as a contributor to a formation of halo artifact. For example, if the difference between the intensity level of element 20 and intensity level of a particular picture element is above a predetermined threshold, then the particular picture element is defined as contributor to a formation of halo artifact. It is to be understood that any mathematical procedure, other than a difference, between the intensity levels may also be employed in the halo-test.

The halo-test is performed, preferably on each picture-element of the image, more preferably on each picture-element in the regions other than the center region, and most preferably on each picture-element in the remote region.

Once the halo-test is performed, the procedure of eliminating the halo artifacts is executed as follows: let p be a picture element which has been defined in the halo-test as a contributor to a formation of halo artifact. Then, for the purpose of calculating the overall intensity, the intensity level of p is preferably replaced with a new, predetermined, intensity level. The predetermined intensity level is not limited and may be, for example, a constant, a function of the intensity level of element 20, an average intensity level and the like. According to a preferred embodiment of the present invention, once the calculation of the overall regional intensities is completed, the original value of p is restored.

An alternative procedure for eliminating the halo artifacts may also be performed. In this alternative, the sizes of the center, surrounding and/or remote regions preferably depend on whether a contributor to a formation of halo artifact has been defined in the respective region. More particularly regions with no contributors to a formation of halo artifact are larger than regions in which one or more such contributors were found in the halo-test.

The regional spatial profiles, $f_r$, used for calculating the overall regional intensities are preferably spatial decaying functions, with may have different forms, depending on the region in which the profiles are applied. Examples for the specific form of each regional spatial profile include, but are not limited to, a Gaussian, an exponent, a Lorenzian, a modified Bessel function and a power-decaying function. These function are typically characterized by a slope, denoted $K_r$ (r="center", "surround", "remote"), which may be different for each region.

Preferably, the regional spatial profiles, $f_r$, and more preferably the remote spatial profile, may be constructed so as to reduce halo-artifacts, for example by selecting an appropriate width thereto. Specifically, narrow remote spatial profile is selected when one or more contributors to a formation of halo were detected in the halo-test, and wide remote spatial profile is selected when no such contributor was detected. In other words, large overall intensities correspond to narrow regional spatial profiles and low overall intensities correspond to wide remote spatial profile.

According to a preferred embodiment of the present invention the regional spatial profiles are normalized as follows. The center and remote spatial profiles are preferably normalized to a unity; the surround spatial profile is preferably normalized to a surround-center ratio parameter, which is typically from about 0.6 to about 0.9.

The forth step of the method, is preferably executed by adapting the overall center intensity using the overall surround intensity and the overall remote intensity. This may be done, for example, by calculating an adaptation function having a center adaptation term, $\sigma_{center}$, and a surround adaptation term, $\sigma_{surround}$.

Center adaptation term, $\sigma_{center}$, and a surround adaptation term, $\sigma_{surround}$, preferably comprises two parts, to account for the influence of the remote region. These parts are preferably functions of the regional overall intensity, in a manner that will be now explained. Hence, denoting the parts of $\sigma_{center}$ by a center-local part and a center-remote part, the center-local part is preferably a function of the overall center intensity, and the center-remote part is preferably a function of overall remote intensity. Similarly, denoting the parts of $\sigma_{surround}$ by a surround-local part and a surround-remote part, the surround-local part is preferably a function of the overall surround intensity, and the surround-remote part is preferably a function of overall remote intensity.

The local parts and the remote parts of the center and surround adaptation terms determine the relative weight of the remote region on each adaptation term. The local parts are preferably calculated as linear functions of the regional overall intensities (with either constant or variable coefficients). The remote parts are preferably calculated using the above mentioned adaptation weight-functions.

Denoting the center-remote adaptation weight-function by $c_{center}$, and the surround-remote adaptation weight-function by $c_{surround}$, the center and surround adaptation terms may thus be calculated according to the following equations (note that the regional index, r, is used in Equation 3 only for center or surround):

$$\sigma_r = \alpha_r G_r + \beta_r + c_r G_{remote} \quad \text{(EQ. 3)}$$

where $\alpha_r$ and $\beta_r$ are the coefficients of the local parts of the adaptation terms, and, as stated, these coefficients may be either constant or variables. Preferably, the value of these coefficients may be chosen in accordance with the dynamic range of the image which is inputted. For example, a first set of coefficient may be selected for a dynamic range of 2 orders of magnitude or below and a second set of coefficient may be selected for a dynamic range of above 2 orders of magnitude. More sets of coefficients for other dynamic ranges are also not excluded from the present invention. A typical numerical value for $\alpha_r$ is from about 0.1 to about 1.0, and typical numerical value for $\beta_r$ is from about 10 and 1000.

The coefficients $\alpha_r$ and $\beta_r$ may also be used for the purpose of solving the above-mentioned problem of halo-formations. It has been found by the inventors of the present invention that the halo-formation phenomenon is more sensitive to the value of $\beta_r$ than to the value of $\alpha_r$. Hence, according to a preferred embodiment of the present invention the value of $\beta_r$ is selected as a function of the relations between the overall intensities, for example, as a function of $G_{remote} - G_{surround}$, or as a function of the $G_{center} - 0.5(G_{remote} - G_{surround})$, or any other suitable combination of two or more overall intensities. It is to be understood, however, that it is not intended to limit the scope of the present invention to use only $\beta_r$ in the above procedure of reducing/eliminating halo artifacts. Thus, in another embodiment $\alpha_r$ may also be a function of the overall intensities as further detailed hereinabove.

Although the coefficients of Equation 3 are mathematical coefficients, they are preferably based on electro-physiological findings. In accordance with the above physiological "gain control", each of the center and surround adaptation term independently characterizes a dynamical intensity curve. The coefficients $\alpha_r$ are thus determine the degree of curve-shifting, for example, higher values of $\alpha_r$ lead to higher shifting amount of the response curve. The combination between $\alpha_r$ and $\beta_r$ determine the onset of the gain-control mechanism, hence $\alpha_r$ and $\beta_r$ serve as gain thresholds.

As can be seen form Equation 3, the center-remote and surround-remote parts $c_{center} G_{remote}$ and $c_{surround} G_{remote}$, respectively, are defined as a multiplication between the center-remote and surround-remote adaptation weight-functions and the overall remote intensity. As stated the number of adaptation weight-functions may vary and the fact that Equation 3 includes two adaptation weight-functions is to be understood as a non-limiting example. Hence, the adaptation weight-functions modulate the adaptation in accordance with the intensity levels of picture elements in the remote region. A particular feature of the adaptation weight-functions is that these functions serve also for preserving and/or improving the contrast of the image, in a manner that will be now described.

Hence, at the vicinity of element 20, a local-contrast is preferably defined as the difference between the intensity level of element 20 and the picture elements of the surrounding region, where a large difference is interpreted as a higher local-contrast and a low difference is interpreted as a lower local-contrast. This difference may be calculated by more than one way, for example, by subtraction, division, subtraction of logarithms, discrete differentiation, discrete logarithmic differentiation or any other suitable mathematical operation between intensity levels. The adaptation weight functions are selected in accordance with the local-contrast calculations. Specifically, in regions in which the local-contrast is high these functions have small numerical values and in regions in which the local-contrast is low these functions have higher numerical values. An additional fine tuning may also be achieved in the embodiments in which there are two adaptation weight functions, where the value of each adaptation weight function may be selected independently.

Preferred expression for the center-remote adaptation weight function and for the center-surround adaptation weight function are:

$$c_{center}=c'(k-(G_{center}-G_{surround})) \text{ and}$$

$$c_{surround}=\text{constant}, \qquad (EQ. 4)$$

where, c' is a constant k is a function of, e.g., a local or a global value of intensity. For example, in one embodiment, k may be a function of the maximal intensity of the image, $I_{max}$, in another embodiment k may be a function of a maximal intensity of a region which includes element 20 and an additional embodiment k may be a function of some average intensity value (e.g., local or global average).

According to a preferred embodiment of the present invention, time variation of the above intensities and functions may also be considered. This is particularly useful, for example, when the method is applied to digital video photography, where the intensity level of element 20 and other picture elements vary with time. In this embodiment the overall regional intensities, $G_r$, which become a function of time, t, are preferably redefined in the following manner.

Hence, in addition to the regional spatial profiles, $f_r$, which are applied to the respective region (center, surrounding or remote) at a single value of t, several low-pass temporal filters are applied on the overall (time-dependent) regional intensities, $G_r$. Each adaptive low-pass temporal filter may be, for example, a decaying function being dependent both on time, t, and on the prior history of the overall regional intensity to which temporal filter is applied.

According to a preferred embodiment of the present invention, the redefinition of the regional overall intensities is performed by convoluting (i) the overall center intensity with a first low-pass temporal filter, $Q_1$; (ii) the overall surround intensity with a second low-pass temporal filter, $Q_2$; and (iii) the overall remote intensity with a third low-pass temporal filter, $Q_3$.

In this embodiment, the first the second and the third adaptive low-pass temporal filter are realized, as the following functions:

$$Q_i(t)=(1/\tau_i(t))\exp(-t/\tau_i), i=1, 2, 3 \qquad (EQ. 5)$$

where $\tau_i(t)$ are a first, a second and a third time-dependent decay durations and $\tau_i$ are respective time parameters, which may be constants or variables. Typical values for the time parameters are about 250 milliseconds. What makes the $Q_i$ adaptive is that their associated decay duration, $\tau_i(t)$, have explicit dependence on both time and the prior histories of $G_r$. As known from physiological phenomena, the rate of the adaptation has a mild change as a function of signal magnitude, which rate may practically be considered as independent on signal magnitude. Hence, emulating the physiological process by applying a variable dynamic temporal filter on the processed function may diminish the dependence of the rate of the adaptation on signal magnitude. In other words, the low-pass temporal filters are selected so that, irrespectively of the acquired intensities of each of the successive images, a steady state is obtained within a predetermined and substantially constant time interval. The preferred form of the decay durations $\tau_i(t)$ is:

$$\tau_i(t)=\tau_{i,m}/(1+|G'_r(t)-G_r(t)|/G_n) \qquad (EQ. 6)$$

where, $\tau_{i,m}$ are the maximal expected values of $\tau_i(t)$, $G_n$ is a normalization constant, and $G'_r(t)$ is the overall regional intensity, prior to its convolution with $Q_i$. In Equation 6, the indices should be respectively understood, i.e., for i=1, r="center", for i=2, r="surround" and for i=3, r="remote". A typical value of $\tau_{i,m}$ is about 500 milliseconds.

It is stressed that despite being defined in terms of their own output, the overall regional intensities are mathematically well-defined because of the causal definition. Specifically, the overall regional intensities are computed as:

$$G_r(t)=\int G_i(t')Q_i(t-t')dt', \text{ where } 0<t'<t. \qquad (EQ. 7)$$

According to a preferred embodiment of the present invention, the low-pass temporal filters, $Q_i$ (i=1, 2, 3) and, in particular the time parameters $\tau_i$ may also be used for the purpose of reducing/eliminating halo artifacts. Specifically, any one of the time parameters $\tau_i$, preferably $\tau_3$, is selected as a predetermined function of a combination between the overall intensities, as further detailed hereinabove with respect to the coefficients $\alpha_r$ and $\beta_r$ (see Equation 3 and the discussion which follows).

Whether or not the overall regional intensities were redefined according to the above procedure (using either time-dependent or static functions), and whether or not the low-pass temporal filters were used for reducing/eliminating halo artifacts, the new intensity level, R, is now assigned to element 20, using the above-mentioned adaptation function and facilitating the center adaptation term, $\sigma_{center}$, and the surround adaptation term, $\sigma_{surround}$, as further detailed hereinabove.

According to a preferred embodiment of the present invention the adaptation function preferably has the following mathematical form:

$$R=R_{max}[G_{center}/(G_{center}+\sigma_{center})-G_{surround}/(G_{surround}+\sigma_{surround})], \qquad (EQ. 8)$$

where $R_{max}$ is a normalization coefficient, which may be constant or variable. A typical value for $R_{max}$ is from about 200 to about 300.

One immediate advantage of the dynamical property of, $G_r$, hence of the new intensity level through the adaptation function, is the applicability to video photography. Thus, when a constant image is viewed over a certain duration its dynamic range appearance improve as a function of time, much like the behavior of the visual system.

Hence, for a single static image, the dynamical property of, $G_r$, may be exploited by using steady state values for $G_r$. Formally, this may be done by substituting t=∞ in the respective time-dependent expressions (see Equation 5, Equation 6 and Equation 7). One would appreciate that such a procedure results in an optimal dynamic range appearance and therefore in an improved quality of an image.

Figure 4:
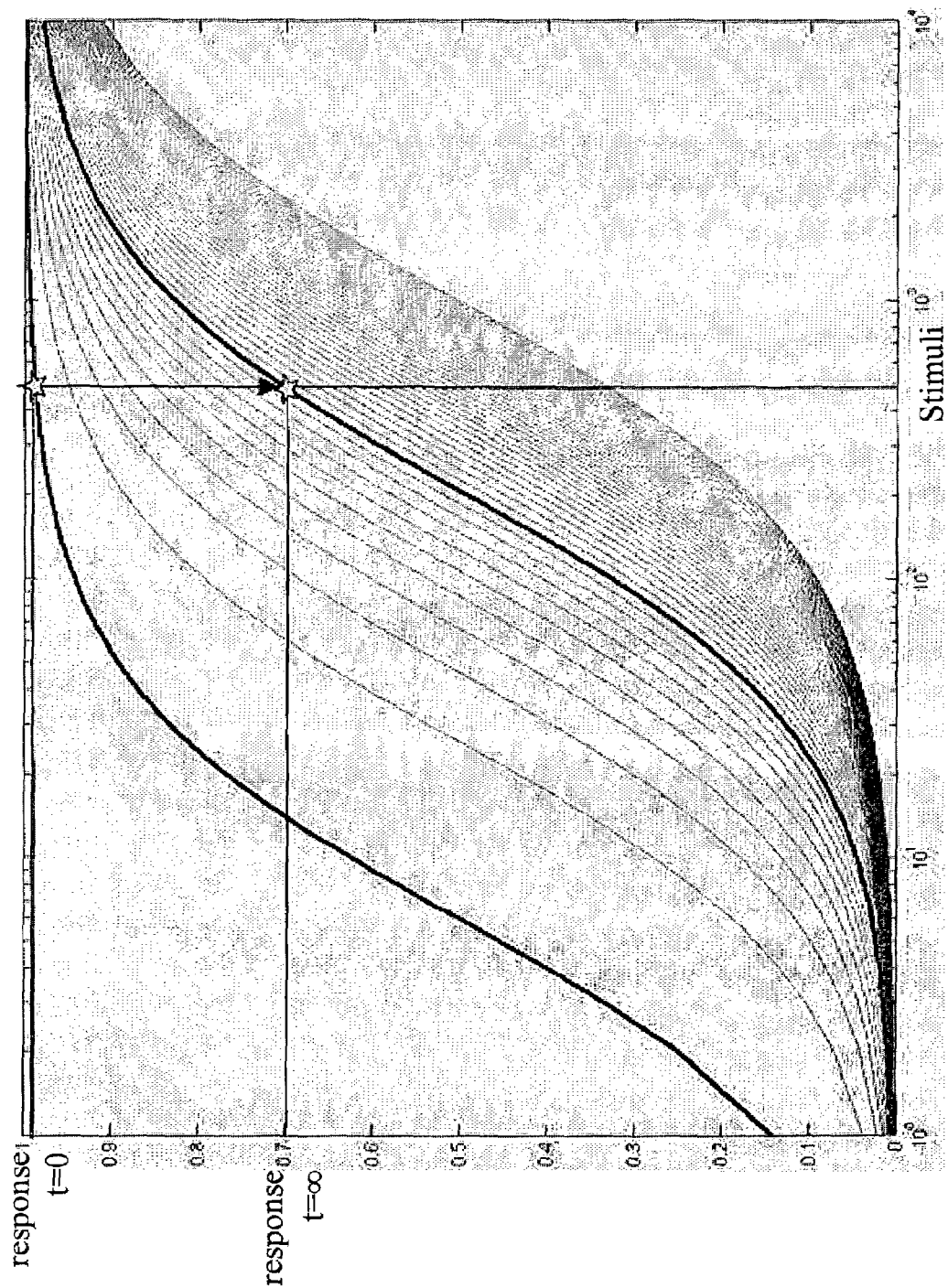
FIG. 4 shows a plurality of intensity curves, having a logarithmic stimulus scale, according to the present invention.

Reference is now made to FIG. 4, showing a plurality of intensity curves, having a logarithmic stimulus scale. In FIG. 4, the stimuli are measured in cd/m² and the responses are normalized and dimensionless. It is to be understood that FIG. 4 is given merely an example and that other scales and dimensions are not excluded from the scope of the present invention. The curve shifting operation is demonstrated with two highlighted curves in FIG. 4, one at t=0 and one at t=∞. As can be seen, for a stimulus of about 500 cd/m² the response at t=0 almost reaches its maximal value of unity, whereas at t=∞ the response is reduced by about 70%, thereby allowing for much wider dynamic ranged to be processed.

According to another aspect of the present invention there is provided a dynamic range modulation device for modulating the dynamic range of the plurality of picture elements, generally referred to herein as device 50.

Figure 5:
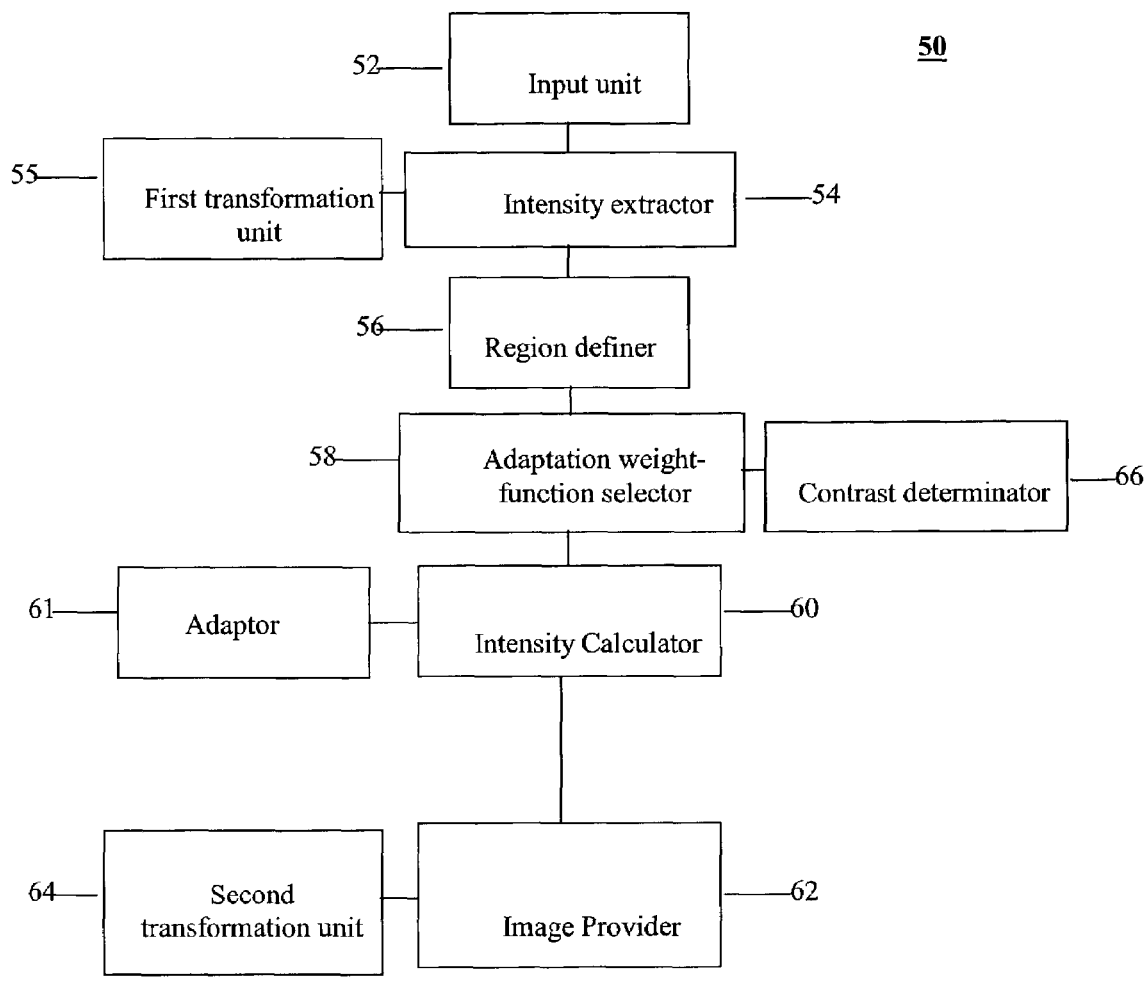
FIG. 5 is a schematic illustration of a dynamic range modulation device, according to the present invention.

Reference is now made to FIG. 5, which is a simplified illustration of device 50, which comprises an input unit 52 for inputting the plurality of picture elements. As further detailed hereinabove, the plurality of picture elements contains image information, and includes the arbitrarily chosen element 20, to which the description refers.

Device 50 further comprises an intensity extractor 54, for extracting from the image information of element 20 an intensity level being in a first dynamic range, which may be of two or more orders of magnitude. Intensity extractor 54 preferably comprises a first transformation unit 55 for transforming the image information to a color coordinate-system having an intensity component, e.g., the CIE XYZ color coordinate-system.

Device 50 further comprises a region definer 56, for defining the surrounding region the remote region and optionally the center region of picture elements.

Device 50 further comprises an adaptation weight-function selector 58, for selecting the above described adaptation weight-functions, and an intensity calculator 60, for calculating and assigning new intensity level, R, having a smaller dynamic range. Preferably, intensity calculator 60 comprises an adaptor 61, which adapts, as already explained, the overall regional intensities, using the adaptation function (see, e.g., Equation 8).

According to a preferred embodiment of the present invention device 50 may further comprise an image provider 62 being associated with a second transformation unit 64. Image provider 62 and second transformation unit 64 preferably perform the above operations of (i) combining the image information and the new intensity level, R, and (ii) performing a backward color coordinate-system transformation so as to provide a new image, represented by the plurality of picture elements and characterized by the second, reduced, dynamic range.

Device 50 is preferably designed for serve also for preserving and/or improving the contrast of the image. Hence, device 50 may further comprise a local-contrast determinator 66 which calculates the difference between the intensity level of element 20 and intensity levels of picture elements of the surrounding region. This local-contrast is used by adaptation weight-function selector 58 for selecting the adaptation weight-functions as further detailed hereinabove.

Figure 6:
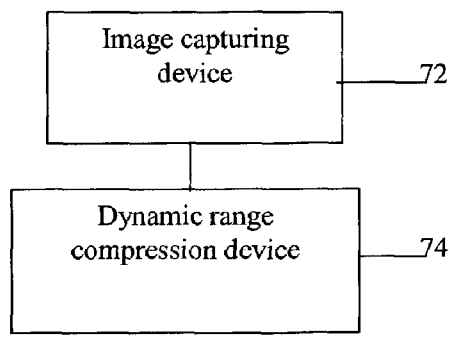
FIG. 6 is a schematic illustration of an imaging device having an image capturing device and a dynamic range modulation device, according to the present invention.
Figure 7B:
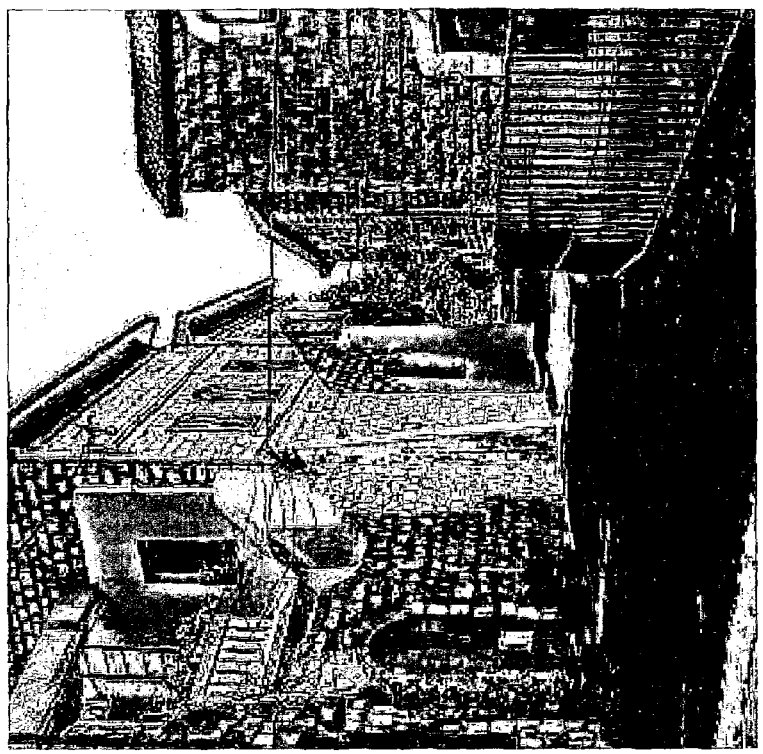
FIGS. 7a-10b show standard RGB images, before (a) and after (b) being processed by the method of the present invention.
Figure 7A:
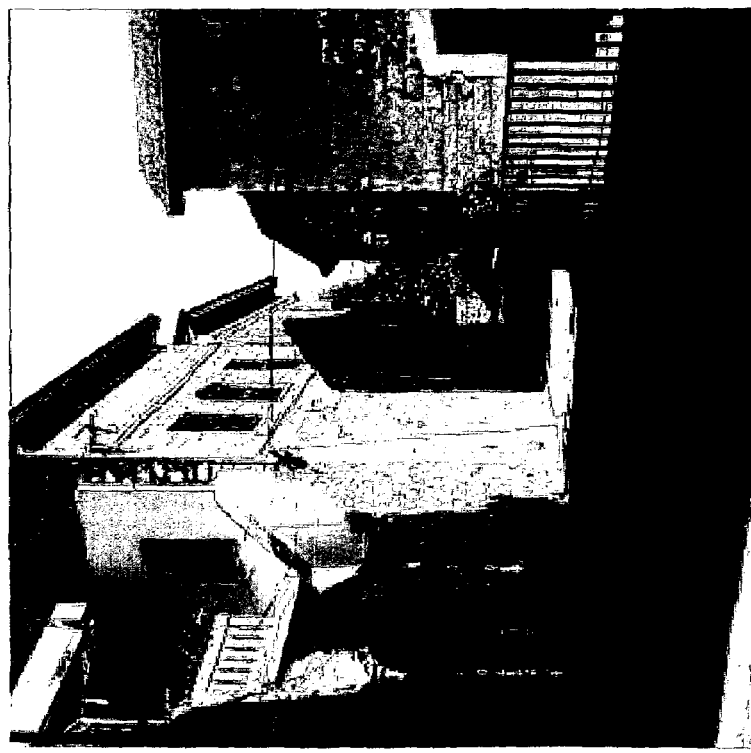
Figure 8A:
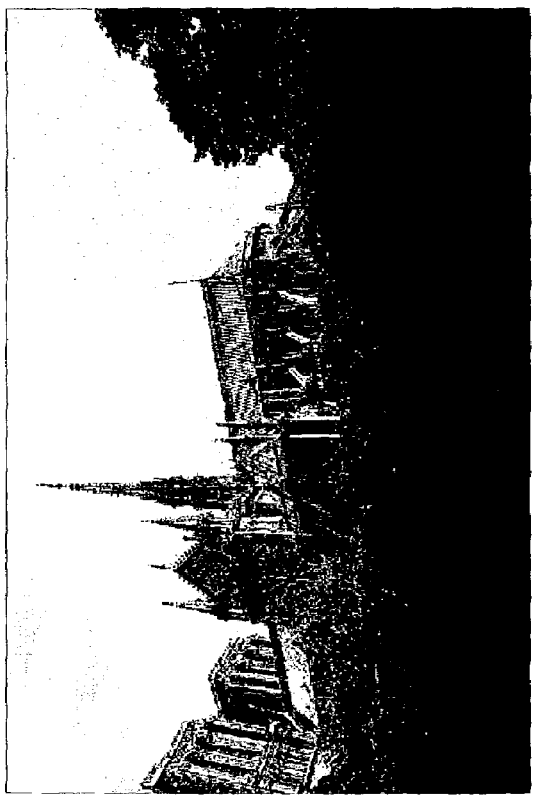
Figure 8B:
Figure 9B:
Figure 9A:
Figure 10B:
Figure 10A:

With reference to FIG. 6, according to an additional aspect of the present invention there is provided an imaging device 70 having an image capturing device 72 and a dynamic range modulation device 74. The principle and operations of dynamic range modulation device 74 are similar to the principle and operations of device 50. According to a preferred embodiment of the present invention image capturing device 72 may be realized, for example, as a camera, a digital camera, a video camera, a CMOS digital camera, a scanner, a computerized tomography scanner, a magnetic resonance imaging scanner, an ultrasonic scanner, an endoscopic imaging device, a radio telescope, a digital telescope or a digital microscope.

It is expected that during the life of this patent many relevant devices for acquiring imagery data will be developed and the scope of the term image capturing device is intended to include all such new technologies a priori.

As stated, the above process of assigning the new intensity level, R, preferably using Equation 8, is repeated for all the picture elements, hence the entire image is assigned with the new intensity level, R. Alternatively, the above operations may be employed contemporaneously for more than one picture element, e.g., using a parallel calculation data processor. Still alternatively, one or more of the above operations may be applied sequentially on more than one picture element, before the next operation starts. For example, the overall regional intensities, $G_r$, may be the calculated for more than one picture elements and then stored in an addressable memory medium, so that it may be reused for further calculations.

Additional objects, advantages and novel features of the present invention will become apparent to one ordinarily skilled in the art upon examination of the following examples, which are not intended to be limiting. Additionally, each of the various embodiments and aspects of the present invention as delineated hereinabove and as claimed in the claims section below finds experimental support in the following examples.

EXAMPLES

Reference is now made to the following examples, which together with the above descriptions, illustrate the invention in a non limiting fashion.

Example 1

Dynamic Range Modulation of Standard Images

Standard images were captured using a conventional digital stills camera, and stored in an RGB format of 256 intensities.

The images were processed by a Pentium IV, 1.5 GHz data processor, programmed to execute the above method steps, taking each picture element to be a single pixel. A total CPU time of a few seconds was used to process one image of about 400×400 pixels.

The numerical values of the parameters, and the radii of the regions used in the processing are given in Table 1:

TABLE 1

| Description | Assignment |
| --- | --- |
| Center region radius | 1 pixel |
| Surrounding region inner radius | 1 pixel |
| Surrounding region outer radius | 3 pixels |
| Remote region radius inner radius | 3 pixels |
| Remote region radius outer radius | 18 pixels |
| Regional spatial profiles slope, $K_r$ | 10 |
| Center, surround and remote spatial profiles | exponents |
| Normalization of center spatial profile | 1 |
| Normalization of surround spatial profile | ⅔ |
| Normalization of remote spatial profile | 1 |
| Naka-Rushton exponent, n | 1 |
| Naka-Rushton saturation constant, $\sigma_{NR}$ | 250 |
| $\alpha_{center}, \alpha_{surround}$ | 0.45 |
| $\beta_{center}, \beta_{surround}$ | 800, 50 |
| $c'$ | 0.7 |
| $c_{surround}$ | 1 |
| $\tau_1, \tau_2, \tau_3$ | 20 ms |
| $\tau_{1m}, \tau_{2m}, \tau_{3m}$ | 500 ms |
| $G_n$ | 1 |
| $R_{max}$ | 255 |

In addition the function $k(I_{max})$ of the center-remote adaptation weight function (see Equation 4) was parameterized as follows:

$k(I_{max}) = I\text{max}$

The results of the image processing were printed on a conventional printer and are shown in FIGS. 7a-10b, where the pre-processed images are designated "a" and the processed images are designated "b". It can be seen that more detailed information is provided in the processed images, with an improved contrast. Hence, the preset invention successfully provides a high dynamic range modulation, sufficient to display the images on a conventional display device, while maintaining and improving the contrast.

Example 2

Dynamic Range Compression of an Image Radiance Map

High dynamic range images, forming radiance maps, were obtained from http://athens.ict.usc.edu/Research/HDR/, in an RGBE format. In this format, 4 bytes are used (as opposed to 3 bytes in conventional images) to create a representation similar to floating point, where the first three bytes represent the three RGB color channels and the forth byte represents a common exponent to the three colors channels. The dynamic range of the images is about 4 orders of magnitude.

Similarly to Example 1, the images were processed by a Pentium IV, 1.5 GHz data processor, programmed to execute the above method steps, taking each picture element to be a single pixel. A total CPU time of a few seconds was used to process one image of about 400×400 pixels.

The numerical values of the parameters, and the radii of the regions used in the processing are given in Table 2:

TABLE 2

| Description | Assignment |
| --- | --- |
| Center region radius | 1 pixel |
| Surrounding region inner radius | 1 pixel |
| Surrounding region outer radius | 3 pixels |
| Remote region radius inner radius | 3 pixels |
| Remote region radius outer radius | 18 pixels |
| Regional spatial profiles slope, $K_r$ | 10 |
| Center, surround and remote spatial profiles | exponents |
| Normalization of center spatial profile | 1 |
| Normalization of surround spatial profile | ⅔ |
| Normalization of remote spatial profile | 1 |
| Naka-Rushton exponent, n | 1 |
| Naka-Rushton saturation constant, $\sigma_{NR}$ | 250 |
| $\alpha_{center}, \alpha_{surround}$ | 750, 0.45 |
| $\beta_{center}, \beta_{surround}$ | 90, 50 |
| c' | 60 |
| $c_{surround}$ | 0.13 |
| $\tau_1, \tau_2, \tau_3$ | 20 ms |
| $\tau_{1m}, \tau_{2m}, \tau_{3m}$ | 500 ms |
| $G_n$ | 1 |
| $R_{max}$ | 255 |

The function $k(I_{max})$ of the center-remote adaptation weight function (see Equation 4) was parameterized similarly to Example 1:

$k(I_{max}) = I\text{max}$

Figure 11B:
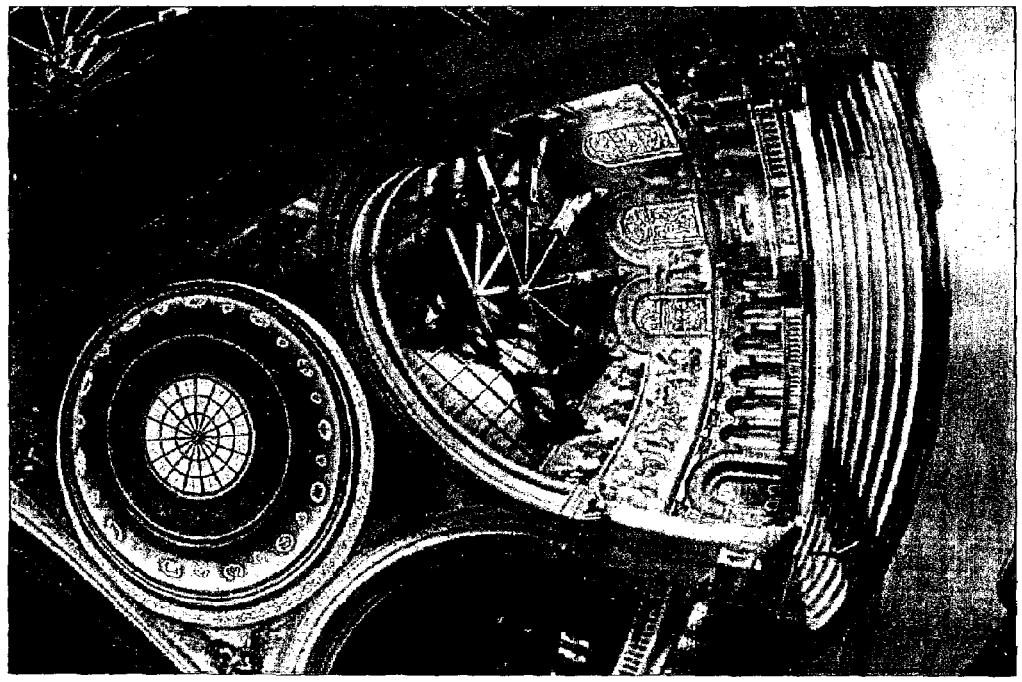
FIGS. 11a-b show high dynamic range images of 4 orders of magnitude, before (11a) and after (11b) being processed by the method of the present invention.
Figure 11A:
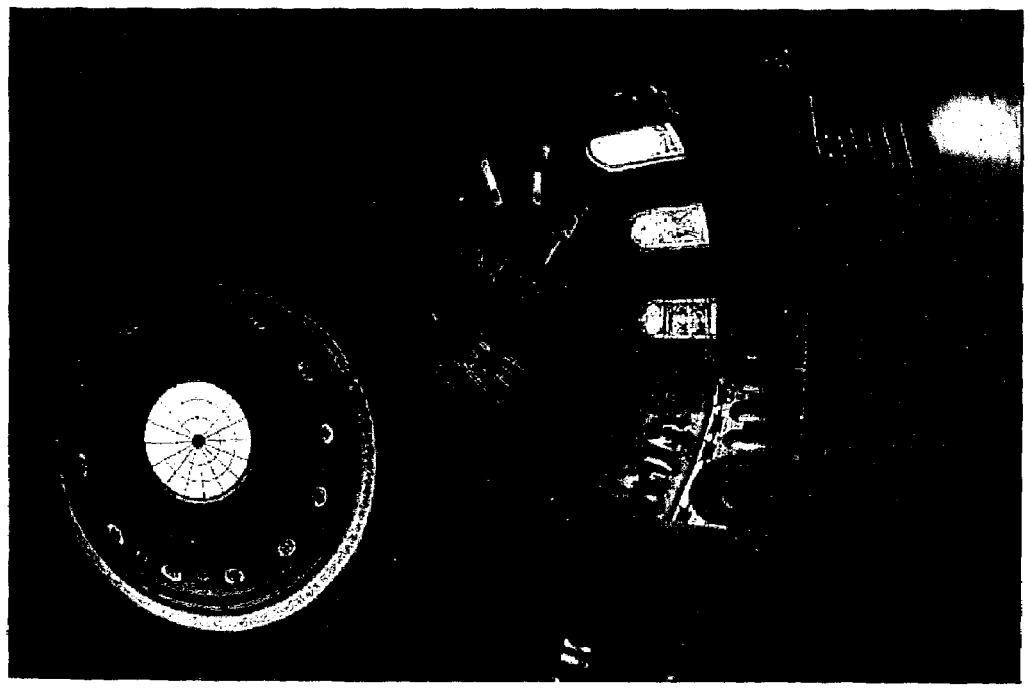

The results of the image processing were printed on a conventional printer and are shown in FIGS. 11a-b, where the pre-processed images are designated "a" and the processed images are designated "b". It can be seen that more detailed information is provided in the processed images, with an improved contrast. Hence, the preset invention successfully provides a high dynamic range compression, from a dynamic range of about 4 orders of magnitude to a dynamic range which is sufficient to display the images on a conventional display device, while maintaining and improving the contrast.

Figure 12B:
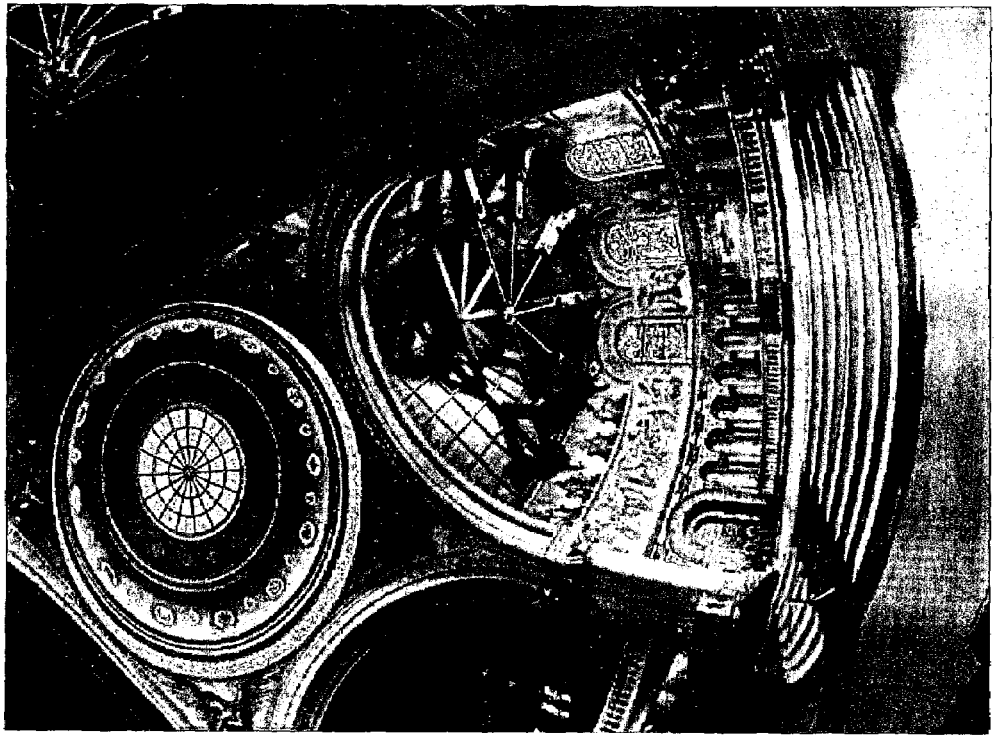
FIGS 12a-b show a comparison between high dynamic range images of 4 orders of magnitude obtained according to prior art method (12a) and according to a preferred embodiment of the present invention (12b).
Figure 12A:
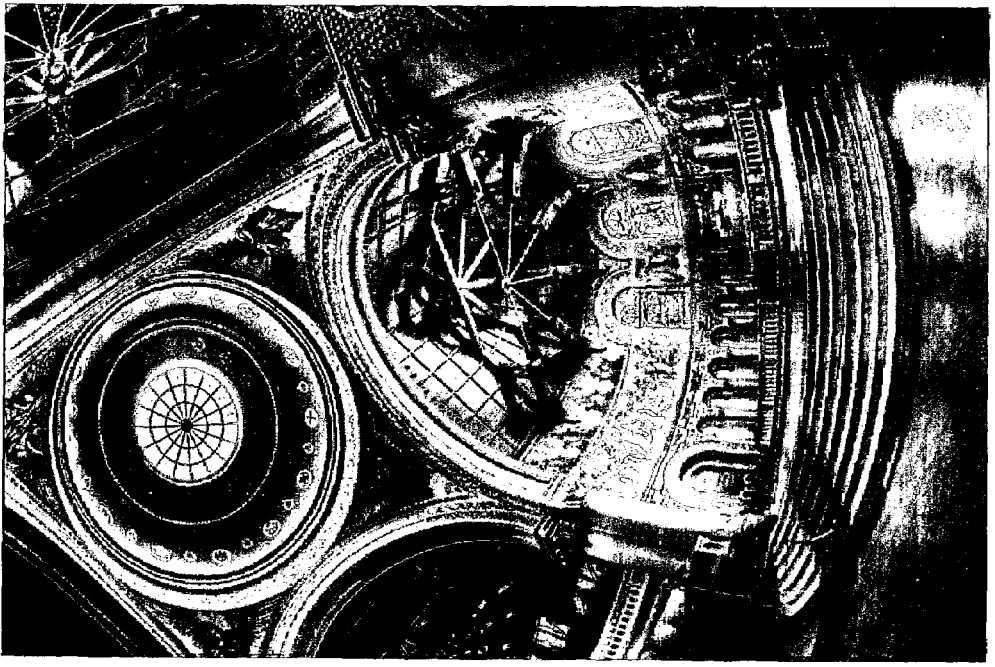

FIGS. 12a-b show a comparison between image obtained according to prior art method (FIG. 12a) and image obtained according to a preferred embodiment of the present invention (FIG. 12b). Both methods are capable of reducing the dynamic range from about 4 orders of magnitude to a dynamic range which is sufficient to display the images on a conventional display device. However, as can be seen from FIGS. 12a-b, the image provided by the present embodiment has an improved contrast over the image provided by the prior art image.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. A method of modulating a dynamic range of a plurality of picture elements each containing image information, the method comprising:
    (a) inputting the plurality of picture elements and extracting, from the image information of a picture element of said plurality of picture elements an intensity level being in a first dynamic range; and
    (b) for said picture element:
        (i) defining a surrounding region of picture elements and a remote region of picture elements;
        (ii) calculating an overall surround intensity using a surround spatial profile, and calculating an overall remote intensity using a remote spatial profile;
        (ii) selecting at least one adaptation weight-function; and
        (iii) using said at least one adaptation weight-function, said overall surround intensity and said overall remote intensity, for assigning a new intensity level to said picture element, said new intensity level being in a second dynamic range, thereby modulating the dynamic range of the plurality of picture elements.

2. The method of claim 1, wherein said second dynamic range is smaller than said first dynamic range.

3. The method of claim 1, wherein the plurality of picture elements are plurality of pixels.

4. The method of claim 1, further comprising redefining said intensity level using a saturation function.

5. The method of claim 1, further comprising defining a center region for said picture element.

6. The method of claim 5, wherein said at least one adaptation weight function comprises a center-remote adaptation weight-function.

7. The method of claim 6, further comprising calculating an overall center intensity using a center spatial profile.

8. The method of claim 7, wherein at least one of said overall center intensity, said overall surround intensity and said overall remote intensity is calculated so as to substantially reduce halo artifacts.

9. The method of claim 7, wherein said center spatial profile, said surround spatial profile and said remote spatial profile are each independently spatial decaying function.

10. The method of claim 7, wherein said assigning said new intensity level comprises adapting said overall center intensity by calculating an adaptation function having a center adaptation term and a surround adaptation term.

11. The method of claim 10, wherein said center and said surround adaptation terms each independently characterizes a dynamical intensity curve.

12. The method of claim 1, wherein said intensity level is static, hence the plurality of picture elements constitutes a still image being characterized by said first dynamic range.

13. The method of claim 1, wherein said intensity level varies with time hence the plurality of picture elements constitutes a sequence of images, characterized by said first dynamic range.

14. The method of claim 13, wherein said sequence of images is a video sequence of images.

15. The method of claim 7, wherein said overall center intensity, said overall surround intensity and said overall remote intensity are static.

16. The method of claim 7, wherein said overall center intensity, said overall surround intensity and said overall remote intensity vary with time.

17. The method of claim 16, further comprising redefining said overall center intensity, by performing a time-convolution of a first adaptive low-pass temporal filter with said overall center intensity.

18. The method of claim 17, wherein said first adaptive low-pass temporal filter is characterized by a first time-dependent decay duration.

19. The method of claim 18, wherein a value of said first time-dependent decay duration at time, t, is determined by a value of said overall center intensity at a preceding time, t'.

20. The method of claim 16, further comprising redefining said overall surround intensity, by performing a time-convolution of a second adaptive low-pass temporal filter with said overall surround intensity.

21. The method of claim 20, wherein said second adaptive low-pass temporal filter is characterized by a second time-dependent decay duration.

22. The method of claim 21, wherein a value of said second time-dependent decay duration at time, t, is determined by a value of said overall surround intensity at a preceding time, t'.

23. The method of claim 16, further comprising redefining said overall remote intensity, by performing a time-convolution of a third adaptive low-pass temporal filter with said overall remote intensity.

24. The method of claim 23, wherein said third adaptive low-pass temporal filter is characterized by a third time-dependent decay duration.

25. The method of claim 24, wherein a value of said third time-dependent decay duration at time, t, is determined by a value of said overall remote intensity at a preceding time, t'.

26. The method of claim 5, wherein said center said surrounding and said remote regions are characterized by periodic boundary conditions.

27. A dynamic range modulation device for modulating a dynamic range of a plurality of picture elements each containing image information, the dynamic range modulation device comprising:
 (a) an input unit for inputting the plurality of picture elements;
 (b) an intensity extractor, for extracting from the image information of a picture element of the plurality of picture elements an intensity level being in a first dynamic range;
 (c) a region definer, operable to define, for said picture element, a surrounding region of picture elements and a remote region of picture elements;
 (d) electronic-calculation functionality for calculating an overall surround intensity using a surround spatial profile, and an overall remote intensity using a remote spatial profile;
 (e) an adaptation weight-function selector, for selecting at least one adaptation weight-function; and
 (f) an intensity calculator, for calculating and assigning a new intensity level based on said at least one adaptation weight-function, said overall surround intensity and said overall remote intensity, said new intensity level being in a second dynamic range to said picture element, thereby modulating the dynamic range of the plurality of picture elements.

28. The dynamic range modulation device of claim 27, wherein said region definer is further operable to define a center region for said picture element.

29. The dynamic range modulation device of claim 28, wherein said at least one adaptation weight function comprises a center-remote adaptation weight-function.

30. The dynamic range modulation device of claim 29, further comprising a local-contrast determinator operable to calculate a difference between said intensity level of said picture element and intensity level of picture elements of said remote region.

31. The dynamic range modulation device of claim 29, further comprising electronic-calculation functionality for calculating an overall center intensity using a center spatial profile.

32. The dynamic range modulation device of claim 31, wherein said intensity calculator comprises an adaptor, for adapting said overall center intensity, using an adaptation function having a center adaptation term and a surround adaptation term.

33. The dynamic range modulation device of claim 27, wherein said intensity level is static, hence the plurality of picture elements constitutes a still image being characterized by said first dynamic range.

34. The dynamic range modulation device of claim 27, wherein said intensity level varies with time hence the plurality of picture elements constitutes a sequence of images, characterized by said first dynamic range.

35. The dynamic range modulation device of claim 31, further comprising electronic-calculation functionality for redefining said overall center intensity, by performing a time-convolution of a first adaptive low-pass temporal filter with said overall center intensity.

36. The dynamic range modulation device of claim 31, further comprising electronic-calculation functionality for redefining said overall surround intensity, by performing a time-convolution of a second adaptive low-pass temporal filter with said overall surround intensity.

37. The dynamic range modulation device of claim 31, further comprising electronic-calculation functionality for redefining said overall remote intensity, by performing a time-convolution of a third adaptive low-pass temporal filter with said overall remote intensity.

38. An imaging device having an image capturing device and a dynamic range modulation device, the dynamic range modulation device comprising:
   (a) an input unit, for inputting a plurality of picture elements as captured by the image capturing device, wherein each picture element of said plurality of picture elements contains image information;
   (b) an intensity extractor, for extracting from said image information of a picture element of said plurality of picture elements an intensity level being in a first dynamic range;
   (c) a region definer, operable to define, for said picture element, a surrounding region of picture elements and a remote region of picture elements;
   (d) electronic-calculation functionality for calculating an overall surround intensity using a surround spatial profile, and an overall remote intensity using a remote spatial profile;
   (e) an adaptation weight-function selector, for selecting at least one adaptation weight-function; and
   (f) an intensity calculator, for calculating and assigning a new intensity level based on said at least one adaptation weight-function, said overall surround intensity and said overall remote intensity, said new intensity level being in a second dynamic range to said picture element, thereby modulating the dynamic range of said plurality of picture elements.

\* \* \* \* \*